(12) United States Patent
Zhao et al.

(10) Patent No.: US 9,195,472 B2
(45) Date of Patent: *Nov. 24, 2015

(54) SYSTEM AND METHOD FOR BOOTING UP A COMPUTER BASED ON DATA CAPTURED IN A NON-VOLATILE SEMICONDUCTOR MEMORY DURING A LEARN MODE

(71) Applicant: Marvell World Trade Ltd., St. Michael (BB)

(72) Inventors: Qun Zhao, Pleasanton, CA (US); Xinhai Kang, Milpitas, CA (US)

(73) Assignee: Marvell World Trade Ltd., St. Michael (BB)

( * ) Notice: Subject to any disclaimer, the term of this patent is extended or adjusted under 35 U.S.C. 154(b) by 145 days.

This patent is subject to a terminal disclaimer.

(21) Appl. No.: 13/857,216

(22) Filed: Apr. 5, 2013

(65) Prior Publication Data

US 2013/0219160 A1   Aug. 22, 2013

Related U.S. Application Data

(63) Continuation of application No. 12/563,239, filed on Sep. 21, 2009, now Pat. No. 8,417,928.

(60) Provisional application No. 61/099,743, filed on Sep. 24, 2008.

(51) Int. Cl.
*G06F 9/00* (2006.01)
*G06F 9/24* (2006.01)
*G06F 9/44* (2006.01)

(52) U.S. Cl.
CPC .............. *G06F 9/441* (2013.01); *G06F 9/4401* (2013.01); *G06F 9/4406* (2013.01)

(58) Field of Classification Search
CPC ............................. G06F 9/4401; G06F 9/4406
USPC .......................................................... 713/1, 2
IPC ........................................... G06F 9/44, 9/4401
See application file for complete search history.

(56) References Cited

U.S. PATENT DOCUMENTS 6,430,662 B1   8/2002   Hurich et al.
7,281,127 B2   10/2007  Rothman et al.
(Continued)

FOREIGN PATENT DOCUMENTS

JP   H09231084 A    9/1997
JP   2005018418 A   1/2005
(Continued)

OTHER PUBLICATIONS

International Search Report and Written Opinion for PCT Application No. PCT/US2009/058152 mailed Nov. 20, 2009; 10 pages.

*Primary Examiner* — Jaweed A Abbaszadeh
*Assistant Examiner* — Phil Nguyen

(57) ABSTRACT

A system includes a timer and a control module. The control module: in response to a first request for first data, determines whether the first data is stored in a non-volatile semiconductor memory (NVSM); in response to the first data not being stored in the NVSM, (i) loads the first data from a hard disk drive (HDD) and boots up a computer a first time based on the first data, and (ii) while operating in a learn mode and while loading the first data from the HDD, captures a portion of the first data in the NVSM; in response to the timer indicating an end of a period during which the computer is booted up the first time, ceases the capturing of the first data; and based on the portion of the first data captured in the NVSM during the learn mode, boots up the computer a second time.

17 Claims, 8 Drawing Sheets

(56) References Cited

U.S. PATENT DOCUMENTS

| | | |
|---|---|---|
| 7,454,653 B2 | 11/2008 | Nicholson et al. |
| 7,480,819 B1 | 1/2009 | Mahmoud et al. |
| 7,711,941 B2 | 5/2010 | Henry et al. |
| 8,417,928 B2 | 4/2013 | Zhao et al. |
| 2003/0005223 A1* | 1/2003 | Coulson et al. ............... 711/118 |
| 2003/0084239 A1 | 5/2003 | Stewart |
| 2004/0107424 A1 | 6/2004 | Wang |
| 2004/0225874 A1 | 11/2004 | Burr et al. |
| 2004/0260919 A1 | 12/2004 | Takahashi |
| 2005/0283598 A1 | 12/2005 | Gaskins et al. |
| 2006/0133362 A1* | 6/2006 | Stein et al. .................... 370/360 |
| 2006/0242398 A1 | 10/2006 | Fontijn et al. |
| 2007/0220247 A1 | 9/2007 | Lee et al. |
| 2008/0082812 A1 | 4/2008 | Kirshenbaum et al. |
| 2009/0089572 A1 | 4/2009 | Jun |
| 2009/0327683 A1 | 12/2009 | Cabot et al. |
| 2010/0058045 A1 | 3/2010 | Borras et al. |

FOREIGN PATENT DOCUMENTS

| | | |
|---|---|---|
| JP | 2006163714 A | 6/2006 |
| JP | 2006309782 A | 11/2006 |
| JP | 2006526831 A | 11/2006 |
| WO | WO-2008000088 A1 | 1/2008 |

* cited by examiner

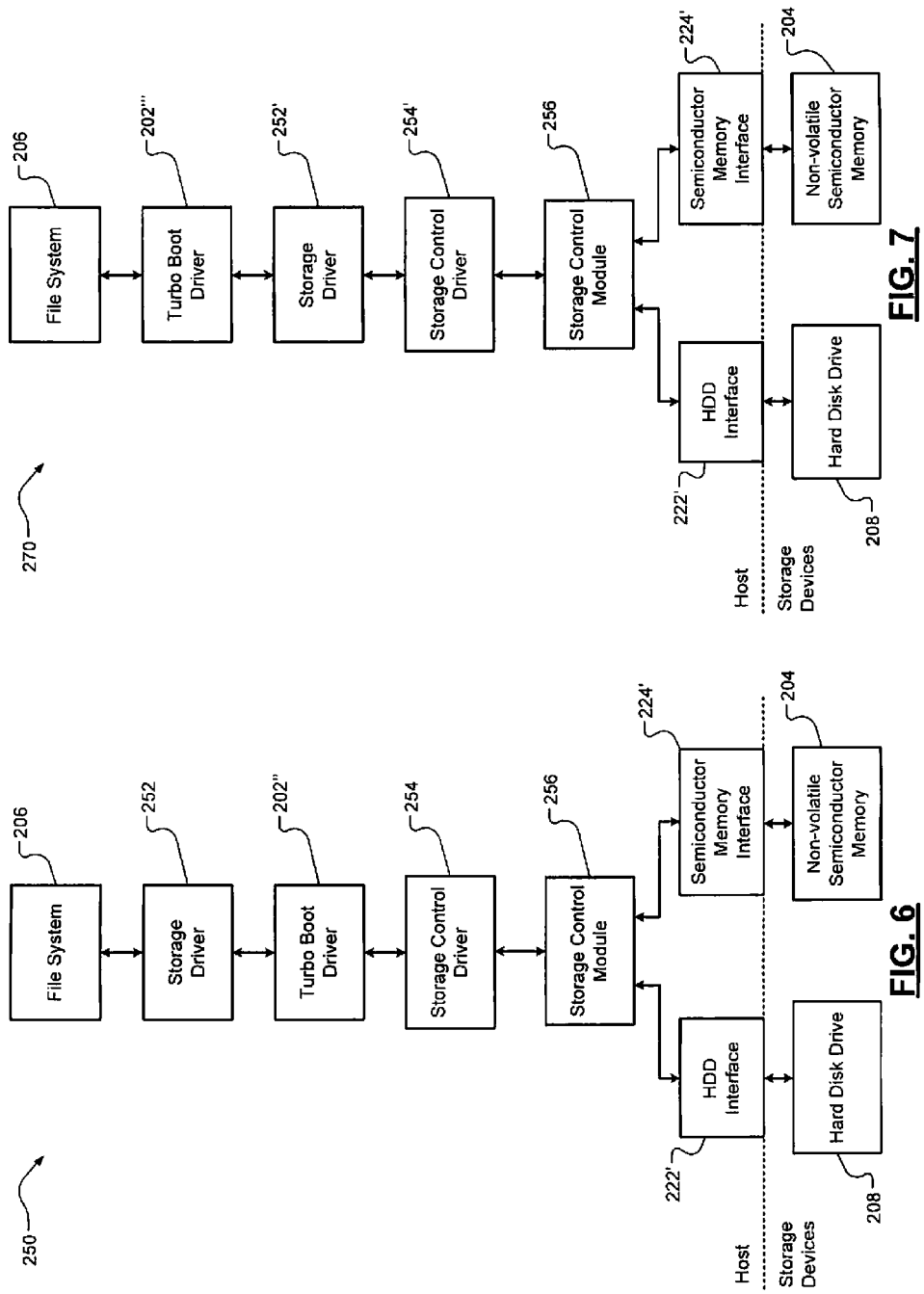

SYSTEM AND METHOD FOR BOOTING UP A COMPUTER BASED ON DATA CAPTURED IN A NON-VOLATILE SEMICONDUCTOR MEMORY DURING A LEARN MODE

CROSS-REFERENCE TO RELATED APPLICATIONS

This application is the continuation of U.S. patent application Ser. No. 12/563,239 (now U.S. Pat. No. 8,417,928), filed Sep. 21, 2009, which claims the benefit of U.S. Provisional Application No. 61/099,743, filed on Sep. 24, 2008. The disclosures of the applications referenced above are incorporated herein by reference.

FIELD

The present disclosure relates to boot up systems.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A computer executes a boot up procedure after switching to a powered ON state. The boot up procedure includes a basic input/output system (BIOS) mode and an operating system mode. During the BIOS mode a pre-boot or power ON self test (POST) procedure is executed followed by a boot loader procedure. The POST procedure initializes certain hardware and executes a master boot record to load and execute a boot loader procedure. The boot loader procedure loads the operating system kernel and various device drivers including a boot disk controller driver and a disk driver. An example boot loader for Windows NT™ is the NT loader (NTLDR). The boot loader or NTLDR loads and executes an operating system (OS) kernel, such as the Windows NT™ OS kernel (NTOSKRNL).

During the operating system mode, the OS is configured and auto-start drivers are loaded and initialized. The auto-start drivers and other software code are loaded from the HDD and executed. The other software code may be associated with configuration of the OS and/or may be associated with various services and program applications. The services may include device manager services, security services, network connection services, printing services, electronic mail (email) services, etc. The program applications may, for example, include web browsing, email, and word processing applications.

During the operating system mode, a graphical user interface (GUI) is activated and a logon mode is enabled after the OS is configured. The logon mode includes the loading and executing of the services. The logon mode is used to load a user profile based on an entered username and password. The program applications may be executed after logon is completed.

Operating systems are increasing in size and complexity. The number of software drivers, services and applications and the amount of associated code and/or data accessed during boot up is also increasing. As a result, operating system boot up times are increasing.

SUMMARY

A system is provided and includes a first interface, a second interface, a timer, and a control module. The first interface is configured to access a hard disk drive. The second interface is configured to access a non-volatile semiconductor memory. The non-volatile semiconductor memory is separate from the hard disk drive. The timer is configured to indicate an end of a period during which a computer is booted up. The control module is configured to: in response to a first request for first data, determine whether the first data is stored in the non-volatile semiconductor memory; in response to the first data not being stored in the non-volatile semiconductor memory, (i) loading the first data from the hard disk drive and booting up the computer a first time based on the first data loaded from the hard disk drive, and (ii) while operating in a learn mode and while loading the first data from the hard disk drive, capturing a first portion of the first data in the non-volatile semiconductor memory; in response to the timer indicating the end of the period during which the computer is booted up the first time, ceasing the capturing of the first data in the non-volatile semiconductor memory; and based on the first portion of the first data captured in the non-volatile semiconductor memory during the learn mode, booting up the computer a second time.

In other features, a method is provided and includes in response to a first request for first data, determining whether the first data is stored in a non-volatile semiconductor memory. In response to the first data not being stored in the non-volatile semiconductor memory, (i) the first data is loaded from a hard disk drive and booting up a computer a first time based on the first data loaded from the hard disk drive, and (ii) while operating in a learn mode and while loading the first data from the hard disk drive, a first portion of the first data is captured in the non-volatile semiconductor memory. The hard disk drive is separate from the non-volatile semiconductor memory. The method further includes, in response to an end of a period during which the computer is booted up the first time, ceasing the capturing of the first data in the non-volatile semiconductor memory. Based on the first portion of the first data captured in the non-volatile semiconductor memory during the learn mode, the computer is booted up a second time.

In one embodiment, a computer system is provided that includes a hard disk drive and a non-volatile semiconductor memory. The hard disk drive stores a first set of data that includes boot up data. The non-volatile semiconductor memory is distinct from semiconductor memory of the hard disk drive and semiconductor memory of a host of the computer system. A turbo boot driver module stores the boot up data in the non-volatile semiconductor memory and transfers the boot up data from the non-volatile semiconductor memory to a file system of the host during a boot up mode of the host.

In other features, the turbo boot driver module stores a second set of data in the non-volatile semiconductor memory that includes the boot up data.

In other features, the turbo boot driver module includes a learn module that captures and stores the boot up data in the non-volatile semiconductor memory during a first boot up of the host. The turbo boot driver module transfers the boot up data stored in the non-volatile semiconductor memory to the file system during a second boot up of the host.

In other features, the computer system further includes at least one of the file system and a disk storage driver that generates a data access request to access data stored in the hard disk drive. The turbo boot driver module accesses data stored in the non-volatile semiconductor memory to satisfy the data access request.

In other features, the computer system further includes at least one of the file system and a disk storage driver that generates a data access request to update data stored in the hard disk drive. The turbo boot driver module updates data stored in the non-volatile semiconductor memory based on the data access request.

In other features, the turbo boot driver module accesses a first set of boot up data from the hard disk drive and accesses a second set of boot up data from the non-volatile semiconductor memory. In other features, the turbo boot driver module accesses the first set of boot up data and the second set of boot up data based on a data access request from at least one of the file system and a disk storage driver. In other features, the turbo boot driver module includes a storage mapping module that maps data stored in the hard disk drive to data stored in the non-volatile semiconductor memory.

In other features, the computer system further includes a disk storage driver that receives a hard disk drive data access request from the file system. The turbo boot driver module generates a non-volatile semiconductor memory data access request based on the hard disk drive data access request. A semiconductor memory driver that accesses the non-volatile semiconductor memory via a semiconductor control driver and a semiconductor memory interface based on the non-volatile semiconductor memory data access request.

In other features, the computer system further includes a storage driver that receives a hard disk drive data access request from the file system. The turbo boot driver module generates a non-volatile semiconductor memory data access request based on the hard disk drive data access request. A storage control module that access the non-volatile semiconductor memory via a semiconductor memory interface based on the non-volatile semiconductor memory data access request.

In other features, the turbo boot driver module includes a boot up timer with a predetermined boot up period. The turbo boot driver module stores all or some of the boot up data captured from the hard disk drive during the boot up mode in the non-volatile semiconductor memory until the predetermined boot up period lapses.

In other features, the turbo boot driver module includes a compress and decompress module that: compresses the boot up data before storage in the non-volatile semiconductor memory; and decompresses the stored boot up data when accessed from the non-volatile semiconductor memory.

In still other features, the systems and methods described above may be implemented by computer program(s) executed by one or more processors. The computer program(s) can reside on a computer readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 6 is a functional block diagram of a storage system illustrating turbo boot driver operation after storage driver operation and in accordance with an embodiment of the present disclosure;

FIG. 7 is a functional block diagram of a storage system illustrating turbo boot driver operation before storage driver operation and in accordance with an embodiment of the present disclosure;

DESCRIPTION

Figure 1:
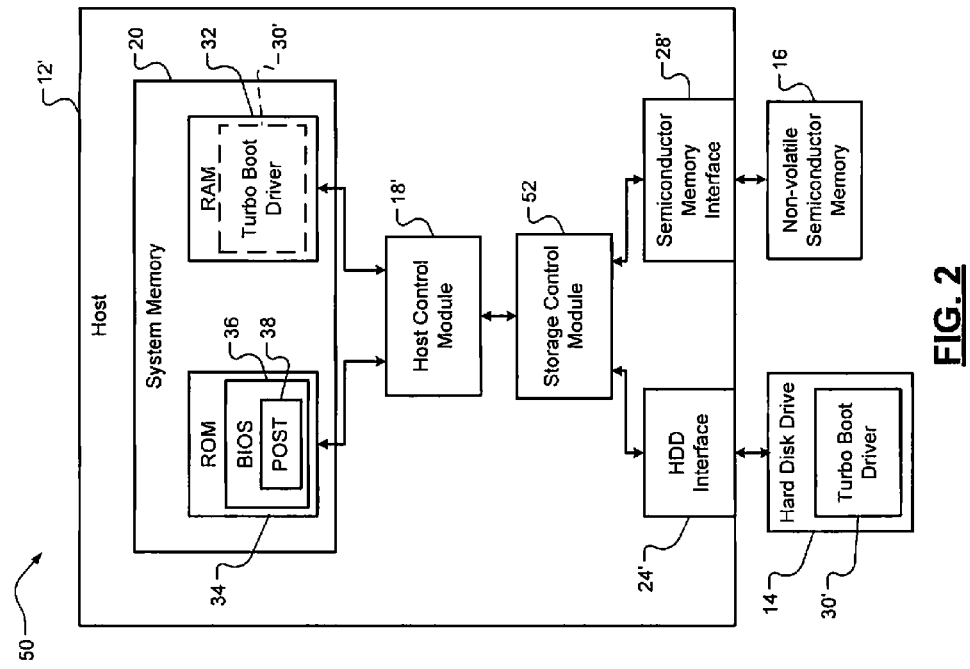
FIG. 1 is a functional block diagram of a computer system incorporating distinct disk and semiconductor memory control modules in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Also, as used herein, the terms host and computer may refer to a desktop, laptop, all-in-one computer, and/or handheld computer. A host or computer may refer to a PDA, a portable computing device, a cellular phone, etc.

In addition, as used herein, the term non-volatile semiconductor memory (NVSM) may refer to any suitable type of semiconductor or solid-state memory, such as flash memory (including NAND and NOR flash memory), phase change memory, magnetic RAM, and multi-state memory. In multi-state memory each memory cell has more than two states. The term non-volatile semiconductor memory does not refer to a hard disk drive (HDD) or to semiconductor memory of a HDD. As used herein a HDD may include a HDD printed circuit board with control modules and semiconductor memory and a HDD assembly with a magnetic storage medium or disk and a read/write device. Non-volatile semiconductor memory may refer to a solid-state drive (SSD).

In the following FIGS. 1-3, items are shown with solid and dashed boxes. The solid boxes identify an original location of stored data. The dashed boxes identify locations where the stored data is transferred and/or copied to for subsequent use.

In FIG. 1, a computer system 10 is shown that includes a host 12, a HDD 14 and a NVSM 16. The host 12 may be a computer and/or motherboard that accesses data on the HDD 14 and/or the NVSM 16 during and after boot up of the host 12. The host 12 includes a host control module 18 and system memory 20. The host control module 18 communicates with the HDD 14 via a disk control module 22 and a HDD interface 24. The host control module 18 communicates with the NVSM 16 via a semiconductor memory control module 26 (e.g., flash memory control) and a semiconductor memory interface 28. The NVSM 16 is distinct from semiconductor memory of the host 14 (e.g., distinct from semiconductor memory on the host 14). The NVSM may be plugged into the semiconductor memory interface 28, which may be connected to the host 14.

During boot up, the host control module 18 loads a turbo boot driver 30 from the HDD 14 into random access memory (RAM) 32 of the system memory 20. The turbo boot driver 30 is used to capture boot up data accessed from the HDD 14, store the boot up data in the NVSM 16 during a first boot up, and access the boot up data from the NVSM 16 during boot ups subsequent to the first boot up. This decreases boot up time. A first boot up may refer to a first time that a computer system is booted up or may refer to a boot up performed during a learn mode after turbo boot is installed and enabled.

The host control module 18 may include a processor, such as a central processing unit (CPU). The host control module 18 may activate or execute the turbo boot driver 30. During execution of the turbo boot driver 30, the host control module 18 may operate as a turbo boot driver module and may operate in multiple modes including a learn mode, a post-learn mode, a bi-storage access mode, and an update mode. In the learn mode, data that is accessed in the HDD 14 during boot up of the host 12 is captured and stored in the NVSM 16. In the post-learn mode, data is accessed from the HDD 14 and/or the NVSM 16 during boot up of the host 12. In the bi-storage access mode, data is accessed from both the HDD 14 and the NVSM 16 during boot up of the host 12. In the update mode, data captured in the learn mode that is updated in the HDD 14 is also updated in the NVSM 16.

The system memory 20 includes read only memory (ROM) 34 and the RAM 32. The ROM 34 may be used to store a basic input/output system (BIOS) 36 including power-on self-test (POST) data 38. The ROM 34 may include erasable programmable ROM (EPROM). The RAM 32 may include double-data-rate synchronous dynamic RAM (DDR SDRAM), dynamic RAM (DRAM), static RAM (SRAM), etc.

The disk control module 22 may include software and/or hardware and control operation of the HDD 14. The semiconductor memory control module 26 may include software and/or hardware and control operation of the NVSM 16. In the embodiment of FIG. 1, the disk control module 22 and the semiconductor memory control module 26 are distinct devices.

Figure 2:
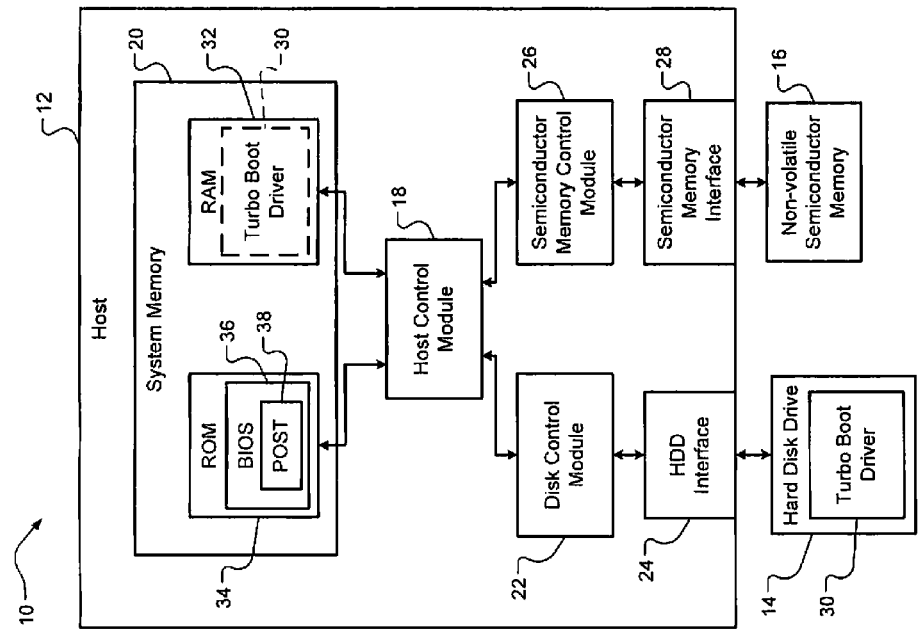
FIG. 2 is a functional block diagram of a computer system incorporating a storage control module in accordance with an embodiment of the present disclosure.

In FIG. 2, a computer system 50 is shown. The computer system 50 is similar to the computer system 10 of FIG. 1. The computer system 50 includes a storage control module 52 instead of a disk control module and a semiconductor memory control module. For example only, the storage control module 52 may be included in a northbridge/southbridge configuration. The storage control module 52 may be or included in a south bridge control module.

The computer system 50 includes a host 12', the HDD 14 and the NVSM 16. The host 12' includes a host control module 18' and the system memory 20. The host control module 18' communicates with the HDD 14 and the NVSM 16 via the storage control module 52 using a HDD interface 24' and a semiconductor memory interface 28'. The HDD 14 stores a turbo boot driver 30' that is configured for data transfer to and from the storage control module 22.

Figure 3:
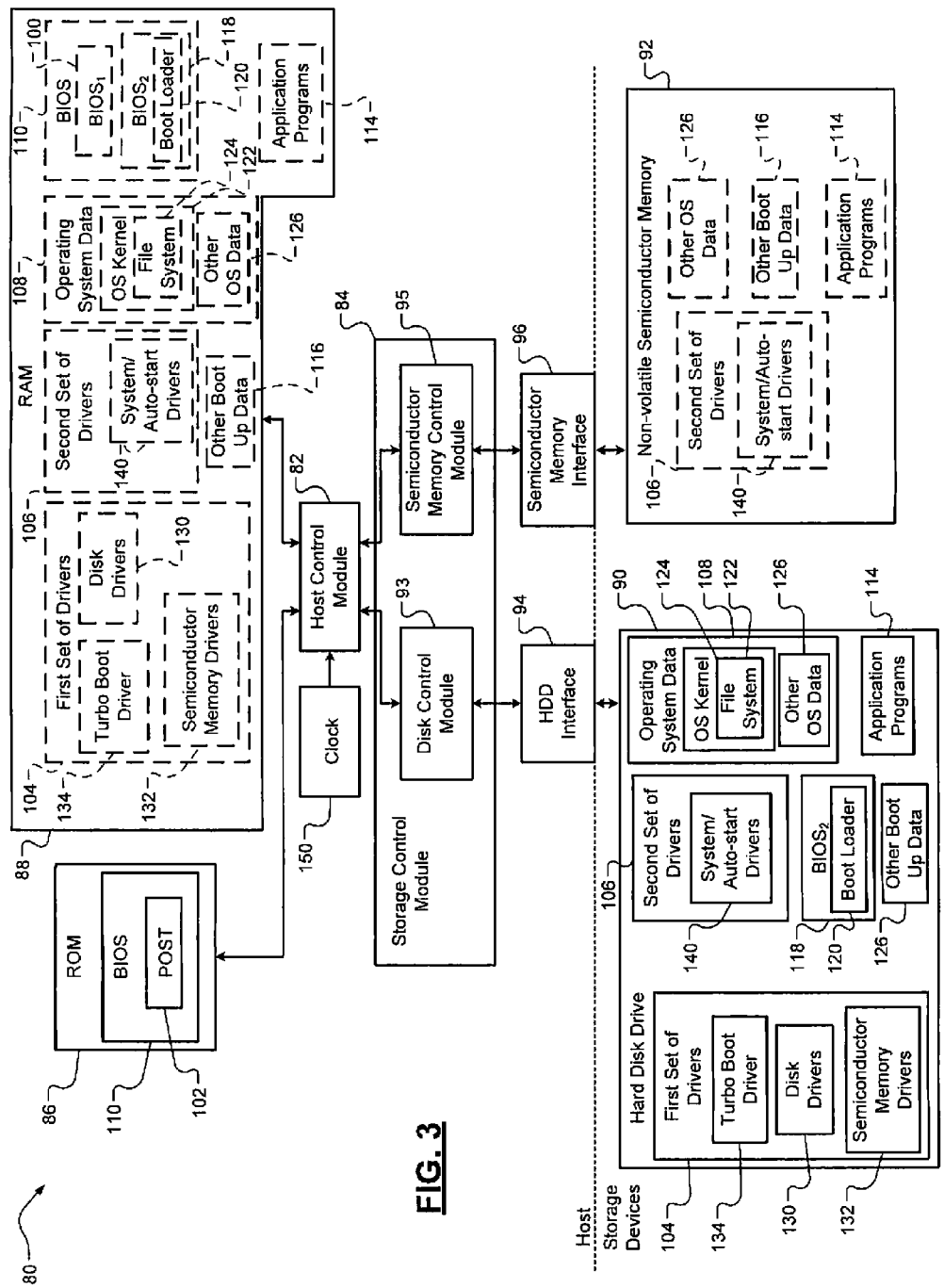
FIG. 3 is a functional block diagram of a computer system illustrating boot up data and software storage in accordance with an embodiment of the present disclosure.

In FIG. 3, a computer system 80 illustrating boot up data and software storage is shown. The computer system 80 includes a host control module 82, a storage control module 84, ROM 86 and RAM 88, which may be included in a host. The host control module 82 accesses a HDD 90 and a NVSM 92 via the storage control module 84 and respective HDD and semiconductor memory interfaces 94, 96. The host control module 82 may access data on the HDD 90 and/or the NVSM 92 during and after boot up of the host via a disk control module 93 and a semiconductor memory control module 95 of the storage control module 84. The ROM 86, RAM 88, HDD 90 and NVSM 92 are used to store certain data before, during and after boot up of the computer system 80.

The ROM 86 stores a first BIOS portion 100 of BIOS 110 including a POST 102 before, during and after a boot up of the computer system 80. The RAM 88 may store a first set of drivers 104, a second set of drivers 106, OS data 108, the BIOS 110, application programs 114, and/or other boot up data 116 during and after a boot up. The BIOS 110 may include the first BIOS portion 100 and a second BIOS portion 118 that includes a boot loader 120. The other boot up data 116 may include boot up configuration data. The OS data 108 may include an OS kernel 122 with a file system 124 and other OS data 126. The other OS data 126 may include OS configuration data.

The first set of drivers 104 may include disk drivers 130, semiconductor memory drivers 132 and the turbo boot driver 134. The disk drivers 130 may include a disk storage driver and a disk control driver, such as that shown in FIGS. 4-7. The disk storage driver is used to control operation of the HDD 90. The disk control driver is used to control operation of the disk control module 93 of the storage control module 84. The semiconductor memory drivers 132 may include a semiconductor storage driver and a semiconductor control driver, such as that shown in FIGS. 4-7. The semiconductor storage driver controls operation of the non-volatile semiconductor memory 92. The semiconductor control driver controls operation of the semiconductor memory control module 95.

The second set of drivers 106 may include system and auto-start drivers 140. For example, the system and auto-start drivers 140 may include a digital subscriber line (DSL) driver, a cable driver, a universal serial bus (USB) driver, a local area network (LAN) driver, security drivers, etc.

The first set of drivers 104 and the second BIOS portion 118 may be loaded from the HDD 90 to the RAM 88 during a boot up. The second set of drivers 106, the application programs 114, the other boot up data 116 and the other OS data 126 may be loaded from the HDD 90 and/or the NVSM 92 to the RAM 88 during a boot up. The first BIOS portion 100 may be loaded from the ROM 86 to the RAM 88 during a boot up.

During a boot up, the host control module 82 loads the turbo boot driver 134 from the HDD 90 into the RAM 88 using the storage control module 84. The storage control module 84 may include the disk control module 93 and the semiconductor memory control module 95. Data that is loaded from the HDD 90 to the RAM 88 may be captured and stored in the NVSM 92 during a learn mode for a first boot up. The data may be loaded from the NVSM 92 to the RAM 88 during boot ups subsequent to the first boot up to decrease boot up time. A computer system may operate in the learn mode for a first boot up and for periodic subsequent boot ups to update content of the NVSM 92.

In the embodiment of FIG. 3, the HDD 90 is shown as the original boot up source for boot up data, as the HDD 90 is the initial source of the boot up data. The NVSM 92 is used to mirror certain boot up data stored in the HDD 90. The NVSM 92 may mirror the boot up data based on boot up time and not based on the type of the boot up data. For example, the host control module 82 may use the NVSM 92 to capture any data accessed in the HDD 90 during a predetermined time period, which may be based on a clock 150. The host control module 82 may stop capturing data when the predetermined period has lapsed independent of the type of data accessed in the HDD 90.

The NVSM 92 may be used as an alternative, a backup, and/or a supplemental source of boot up data relative to the HDD 90. Although the HDD 90 is shown as initially storing the first and second set of drivers 104, 106, the OS data 108, the second BIOS portion 118, the application programs 114, and the other boot up data 116, the NVSM 92 may initially store these items and be used as the primary and/or original boot up source. In this alternative embodiment, the HDD 90 may store the second set of drivers 106, the application programs 114, the other boot up data 116 and the other OS data 126. The HDD 90 may not store the first set of drivers 104, the second BIOS portion 118, and the OS kernel 122. The alternative embodiment may include the capturing of boot up data from the NVSM 92 during a first boot up. The captured boot up data may be stored in the HDD 90 for use during boot ups subsequent to the first boot up.

Figure 4:
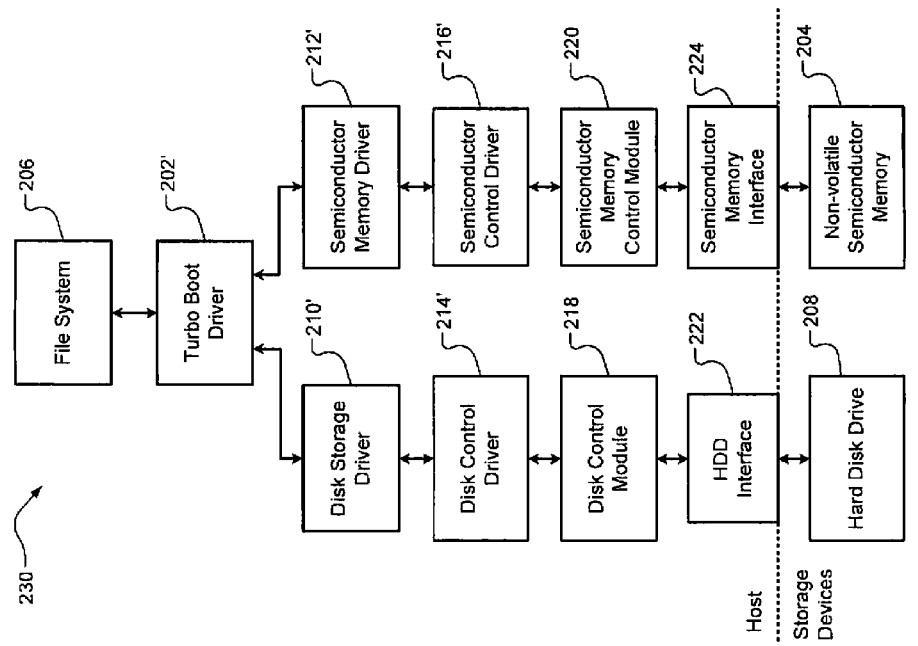
FIG. 4 is a functional block diagram of a storage system illustrating turbo boot driver operation after disk driver operation using distinct disk and semiconductor memory modules and in accordance with an embodiment of the present disclosure.

In FIG. 4, a storage system 200 that includes a turbo boot driver 202 is shown. The turbo boot driver 202 accesses a NVSM 204 based on data access requests initially generated by a file system 206 for data stored in a HDD 208. The turbo boot driver 202 captures data requested from the HDD 208 and stores the data in the NVSM 204 during a learn mode. The turbo boot driver 202 provides data stored in the NVSM 204 to the file system 206 during a post-learn mode. The data provided from the NVSM 204 to the file system 206 may be in addition to, instead of, the same as, and/or different than data provided from the HDD 208. The HDD 208 and the NVSM 204 may provide data to the file system 206 simultaneously and/or during the same time period.

The storage system 200 also includes a disk storage driver 210 and a semiconductor memory driver 212 that may be in direct communication with (i.e., no intermediate modules or communication devices) or directly connected to the file system 206 and are used to control operation of the HDD 208 and the NVSM 204 respectively. The turbo boot driver 202 is located between the disk storage driver 210 and a disk control driver 214 and between the semiconductor memory driver 212 and a semiconductor control driver 216. The disk storage driver 210 may generate HDD data access requests based on data access requests received from the file system 206. The turbo boot driver 202 controls access to the NVSM 204 and the HDD 208 based on the HDD data access requests and the mode of operation.

The turbo boot driver 202 may signal the disk control driver 214 and/or the semiconductor control driver 216 to read data from or write data to the HDD 208 and/or the NVSM 204 respectively. This signal may be based on the HDD data access requests and the mode of operation. The control drivers 214, 216 respectively control operation of a disk control module 218 and a semiconductor memory control module 220. The control modules 218, 220 communicate with the HDD 208 and the NVSM 204 via a HDD interface 222 and a semiconductor memory interface 224 respectively. An HDD read data access request may be satisfied with data from the NVSM 204 and/or the HDD 208. A HDD write data access request may include the writing of data in the NVSM 204 and/or the HDD 208.

The disk storage driver 210 is software based and is used for interfacing with a user and is hardware independent. The disk storage driver 210 is used to visually represent a disk drive (e.g., the hard disk drive 208) of the storage system 200 and contents of the disk drive on a display. The disk control driver 214 is software based and is used as an interface between the disk storage driver 210 and the disk control module 218 and is hardware dependent. The disk storage driver 210 may generate access requests, which are provided to the disk control driver 214. The disk control driver 214 controls operation of the disk control module 218 based on the access requests from the disk storage driver 210. The disk control module 218 is hardware based. The disk storage driver 210 may communicate with different disk control drivers and may be specific to a single disk drive. The disk control driver 214 may control multiple disk drivers. The disk storage driver 210 and the disk control driver 214 may be executed by an OS, where the OS is executed by a processor or, for example, by the host control module 82 and/or the storage control module 84 of FIG. 3.

The semiconductor memory driver 212 is software based and is used for interfacing with a user and is hardware independent. The semiconductor memory driver 212 is used to visually represent non-volatile semiconductor memory (e.g., the non-volatile semiconductor memory 204) of the storage system 200 and contents of the non-volatile semiconductor memory on a display. The semiconductor control driver 216 is software based and is used as an interface between the semiconductor memory driver 212 and the semiconductor memory control module 220 and is hardware dependent. The semiconductor memory control module 220 is hardware based. The semiconductor memory driver 212 may generate access requests, which are provided to the semiconductor control driver 216. The semiconductor control driver 216 controls operation of the semiconductor memory control module 220 based on the access requests from the semiconductor memory driver 212. The semiconductor memory driver 212 may communicate with different disk control drivers and may be specific to a single disk drive. The semiconductor control driver 216 may control multiple disk drivers. The semiconductor memory driver 212 and the semiconductor control driver 216 may be executed by an OS, where the OS is executed by a processor or, for example, by the host control module 82 and/or the storage control module 84 of FIG. 3.

Figure 5:
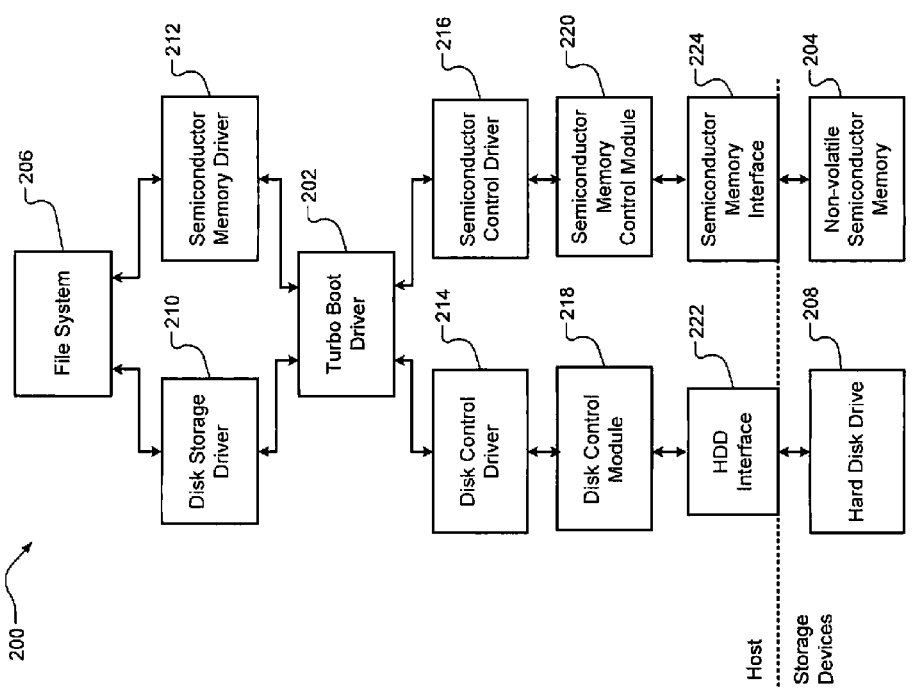
FIG. 5 is a functional block diagram of a storage system illustrating turbo boot driver operation before disk driver operation using distinct disk and semiconductor memory modules and in accordance with an embodiment of the present disclosure.

Referring now also to FIG. 5, a storage system 230 is shown. The storage system 230 is similar to the storage system 200 of FIG. 4. The storage system 230 includes a turbo boot driver 202' that is located between the file system 206 and disk storage and semiconductor memory drivers 210', 212', instead of between the disk storage and semiconductor memory drivers 210, 212 and the disk and semiconductor control drivers 214, 216. The file system 206 generates data access requests. The turbo boot driver 202' generates HDD and NVSM data access requests based on the data access requests received from the file system 206. The HDD and NVSM data access requests are directed respectively to the disk storage and semiconductor memory drivers 210', 212'.

The disk storage and semiconductor memory drivers 210', 212' communicate respectively with a disk control driver 214' and a semiconductor control driver 216'. The disk control driver 214' and the semiconductor control driver 216' access the HDD 208 and the NVSM 204 using the disk and semiconductor memory control modules 218, 220 and the HDD and semiconductor memory interfaces 222, 224.

In FIG. 6, a storage system 250 is shown. The storage system 250 is similar to the storage system 200 of FIG. 4. The storage system 250 includes a storage driver 252 instead of the disk storage and semiconductor memory drivers 210, 212. The storage system 250 also includes a storage control driver 254 instead of the disk and semiconductor control drivers 214, 216.

The storage driver 252 generates HDD and NVSM data access requests based on data access requests received from the file system 206. A turbo boot driver 202" controls operation of the storage control driver 254 based on the HDD and NVSM data access requests. The storage control driver 254 controls operation of a storage control module 256, which respectively accesses the HDD 208 and the NVSM 204 via HDD and semiconductor memory interfaces 222', 224'.

In FIG. 7, a storage system 270 is shown. The storage system 270 is similar to the storage systems 230, 250 of FIGS. 5 and 6. The storage system 270 includes a storage driver 252' and a storage control driver 254'. The file system 206 generates HDD and NVSM data access requests. A turbo boot driver 202''' controls operation of the storage driver 252' based on the HDD and NVSM data access requests. The storage driver 252' is used to control operation of the HDD 208 and the NVSM 204. The storage control driver 254' controls operation of a storage control module 256, which respectively accesses the HDD 208 and the NVSM 204 via the HDD and semiconductor memory interfaces 222', 224'.

In the above FIGS. 1-7, the drivers, modules and interfaces that are associated with the turbo boot drivers 30, 30', 134, 202, 202', 202", 202''' are used for communication with respective HDDs and NVSMs. The drivers, modules and interfaces may include internal data buses, Internet small computer system interfaces (iSCSIs), peripheral component interconnect express (PCIe) interfaces, serial advanced technology attachment (SATA) interfaces, serial attached SCSI (SAS) interfaces and/or fiber channel (FC) interfaces. For example, the disk storage drivers 210, 210', the disk control drivers 214, 214', the semiconductor memory drivers 212, 212', the semiconductor control drivers 216, 216', the disk control modules 218, the semiconductor memory control modules 220, the storage control modules 256, the HDD interfaces 24, 24', 94, 222, 222', and the semiconductor memory interfaces 28, 28', 96, 224, 224' may be iSCSI, PCIe, SATA, serial SAS and/or FC based devices. The drivers, modules and interfaces that are used to communicate with the HDDs and the NVSMs may be of the same type or may be of a different type. For example only, the interfaces used to communicate with a HDD and with a NVSM may be of the SATA type. As another example, the interfaces used to communicate with a HDD may be of the SATA type, whereas the interfaces used to communicate with a NVSM may be of the PCIe type.

Figure 8:
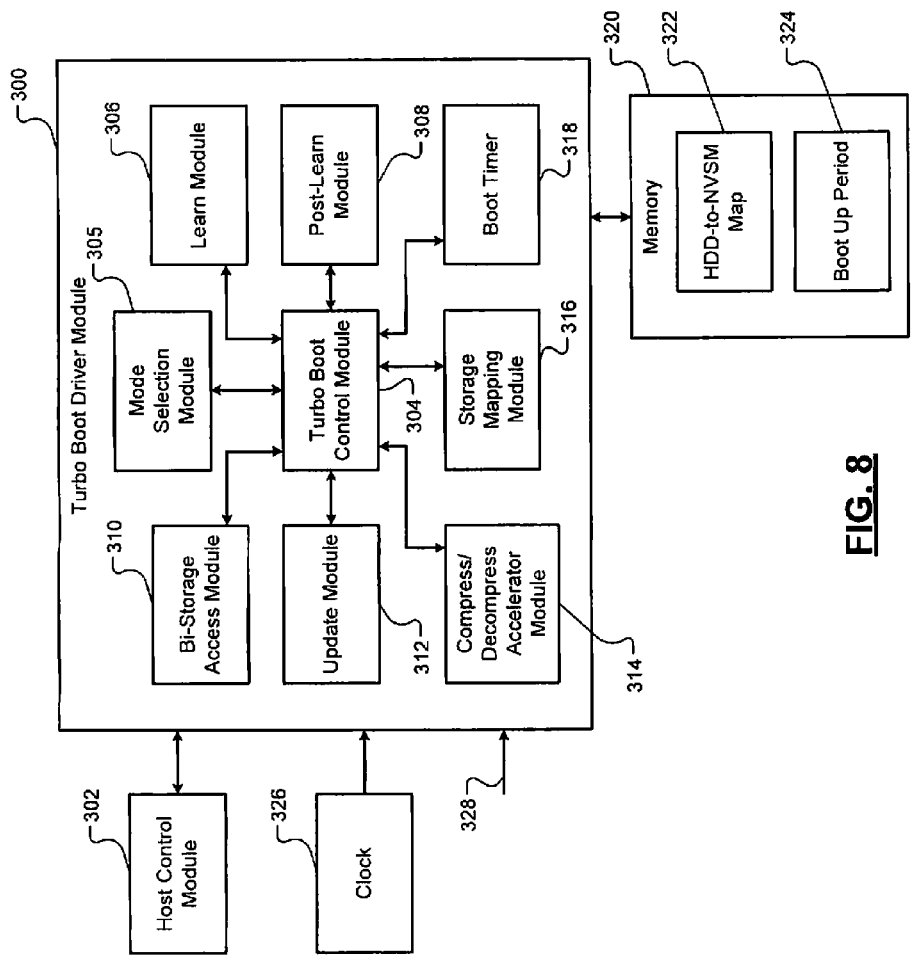
FIG. 8 is a functional block diagram of a turbo boot driver in accordance with an embodiment of the present disclosure.

In FIG. 8, a turbo boot driver module 300 that may communicate with or be included in a host control module 302 is shown. The turbo boot driver module 300 may be located in the host control modules of FIGS. 1-7. The turbo boot driver module 300 may be used in any one of the embodiments of FIGS. 1-7 and 10-11. The turbo boot driver module 300 includes a turbo boot control module 304 that controls operation of the turbo boot driver module 300 and may execute a turbo boot driver, such as that of FIGS. 1-7. The turbo boot driver module 300 also includes a mode selection module 305, a learn module 306, a post-learn module 308, a bi-storage access module 310, an update module 312, a compress/decompress accelerator module 314, a storage mapping module 316 and a boot timer 318.

The mode selection module 305 may be used to select the mode(s) of operation. The mode selection module 305 may activate one or more of the modules 306-318 depending on the selected mode of operation.

The learn module 306 may be used when operating in the learn mode. During the learn mode, boot up data of any type may be captured and stored in a NVSM. The post-learn module 308 may be used when operating in the post-learn mode. The post-learn module 308 may control access to a HDD and a NVSM based on data access requests during a boot up mode. The turbo boot driver module 300 operates in the learn mode and in the post-learn mode during different boot up cycles. A boot up cycle may refer to a boot up procedure performed when a computer is powered on. Each time a computer is powered on the computer may execute a boot up procedure.

The learn module 306 may determine when to operate in the learn mode. For example, when a ratio of cache misses to cache hits and/or a ratio of cache misses to a total of cache accesses exceeds a predetermined threshold, a learn mode flag may be set. The learn mode flag may indicate when a computer system is to operate in the learn mode for a next or subsequent boot up. A cache miss may refer to when the turbo boot driver module 300 receives a request to access boot up data, and the data is not stored in the NVSM. A cache miss may occur when boot up data is stored or updated on the HDD and is not stored or updated on the NVSM. A cache hit may refer to when the turbo boot driver module 300 receives a request to access boot up data, and the data is stored in the NVSM. A cache access may refer to a cache miss or a cache hit.

The bi-storage access module 310 may be used when operating in a bi-storage access mode. The bi-storage access module 310 may control access to both the HDD and the NVSM during the same time period. A first set of data may be accessed from the HDD while a second set of data is accessed from the NVSM. This reduces boot up time.

The update module 312 may be used when data stored in the HDD is updated. The update module 312 detects when data in the HDD is updated and also updates the corresponding data that is stored in the NVSM. This assures that certain boot up data stored in the NVSM mirrors or is the same as certain boot up data stored in the HDD. In one embodiment, the data stored in the NVSM is synonymous with the data stored in the HDD. In another embodiment, the HDD may store the data stored in the NVSM and additional data. The NVSM may include data stored in the HDD and additional data. In other words, the data stored in the HDD may not be all-inclusive of the data stored in the NVSM and vice versa.

The compress/decompress accelerator module 314 may be used to compress data before storage in and for decompression after access from the NVSM and/or memory 320. For example, captured boot up data may be compressed and then stored in the NVSM. Similarly, mapping data may be compressed before storage in the memory 320. Compression and decompression processes may be used to decrease access time associated with the NVSM and the memory 320.

The storage mapping module 316 may be used to control mapping of data captured and stored in the NVSM. Boot up data that is captured and stored in the NVSM based on storage in the HDD is mapped to provide a HDD-to-NVSM map 322 (e.g., conversion table).

The boot timer 318 is used to indicate when to cease capture and storage of boot up data from the HDD into the NVSM. For example, the turbo boot control module 304 and/or learn module 306 may stop the capture of data from the HDD and the storage of the data in the NVSM. This may occur when a predetermined boot up period 324 of the boot timer 318 has lapsed. The boot timer 318 may initialize the predetermined boot up period 324 and determine when the boot up period 324 has lapsed based on a clock signal from a system clock 326.

The predetermined boot up period 324 may be stored in the memory 320 and may be adjusted to account for different boot up times. The time to perform a boot up may vary, for example, based on the tasks performed during a boot up, system performance, etc. As an example, the host control module 302 may generate a boot up time adjustment signal based on an input 328 from a system user. The boot up time adjustment signal may include an updated boot up period, which may be stored in the memory 320 and used to disable the learn mode.

The above embodiments of FIGS. 1-8 may be considered in isolation or may be combined. For example, the file system and drivers of FIG. 3 may be in any one of the arrangements of FIGS. 4-7. Also, the following timing diagram and methods of FIGS. 9-11 may be applied to the embodiments of FIGS. 1-8.

Figure 9:
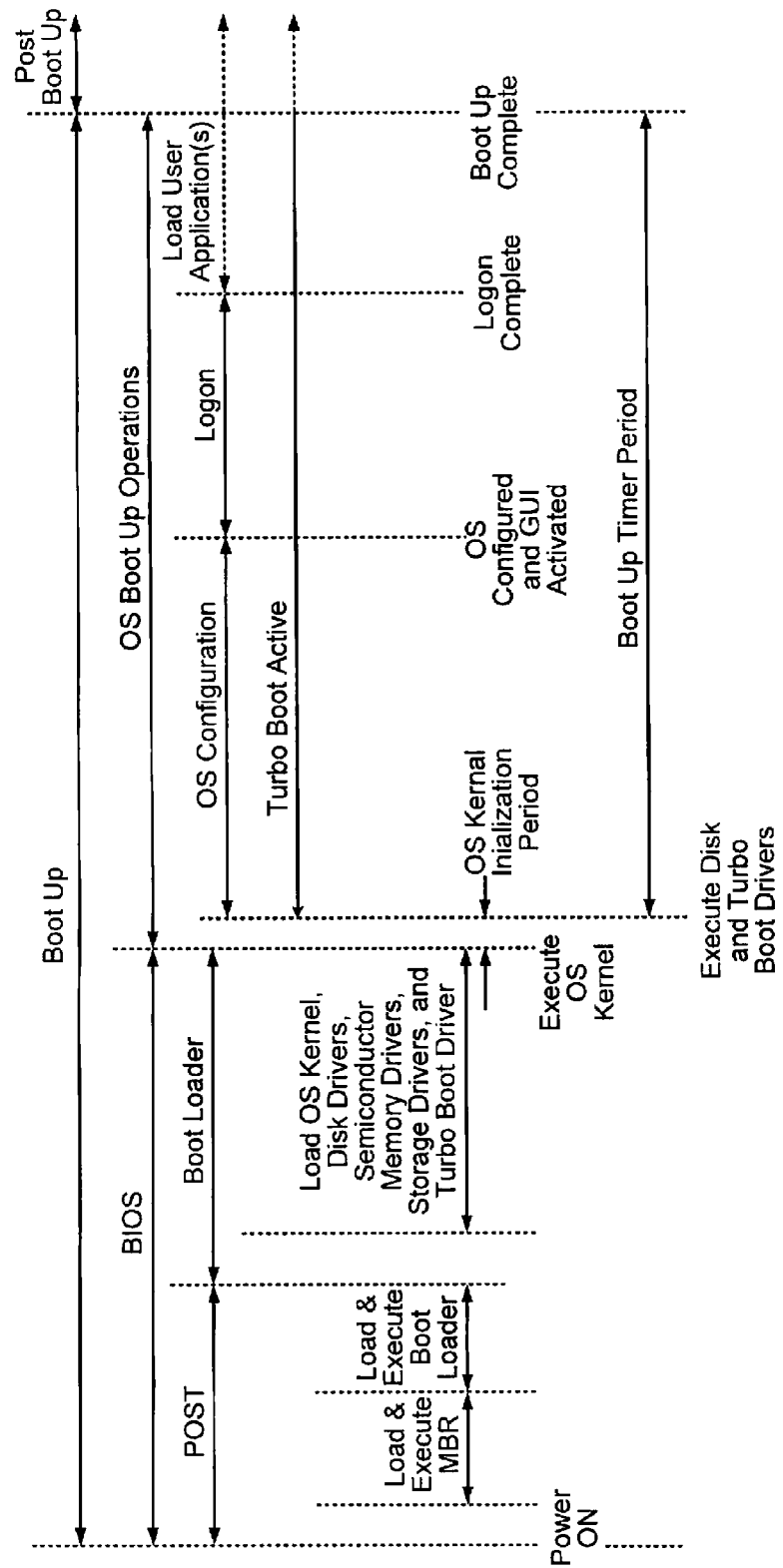
FIG. 9 is a boot up timing diagram in accordance with an embodiment of the present disclosure.

In FIG. 9, a boot up timing diagram is shown. A boot up that is performed by the modules of FIGS. 1-8 may include a BIOS mode and an OS boot up operations mode. The BIOS mode and the OS boot up operations mode may be selected by a mode selection module, such as the mode selection module 305. During the BIOS mode, a POST mode is performed followed by a boot loader mode. During the POST mode, a host control module may load from a HDD a master boot record (MBR). The MBR may then be used to load and execute a boot loader. During the boot loader mode, the boot loader may load an OS kernel, disk drivers, semiconductor memory drivers, storage drivers and a turbo boot driver.

The OS kernel may be executed when the boot loader mode is complete. The OS kernel may initialize during an initialization period including the execution of the disk drivers, the semiconductor drivers, the storage drivers, and the turbo boot drivers. The turbo boot driver may initiate a boot up period when executed, such as the boot up period described with respect to the embodiment of FIG. 8. The turbo boot driver is active during the boot up period and may remain active after the boot up period. Boot up data that is accessed during the boot up timer period may be accessed from a HDD and/or a NVSM.

The OS boot up operations mode includes an OS configuration mode. The OS configuration mode may be followed by a logon mode. The OS of a computer system, such as a Windows™ OS, may be configured during the OS configuration mode. System and auto-start drivers may be loaded and started. When the logon mode is engaged, user may logon on and enter a user name and password. The logon mode may be complete when the username and password are approved and a user profile is loaded. User applications and services may be loaded and executed after the logon mode. In a Windows™-based system, Windows™ desktop is started. Although FIG. 9 illustrates the boot up timer period lapsing when the boot up is complete, the boot up timer period may lapse before or after the completion of the boot up.

Figure 10:
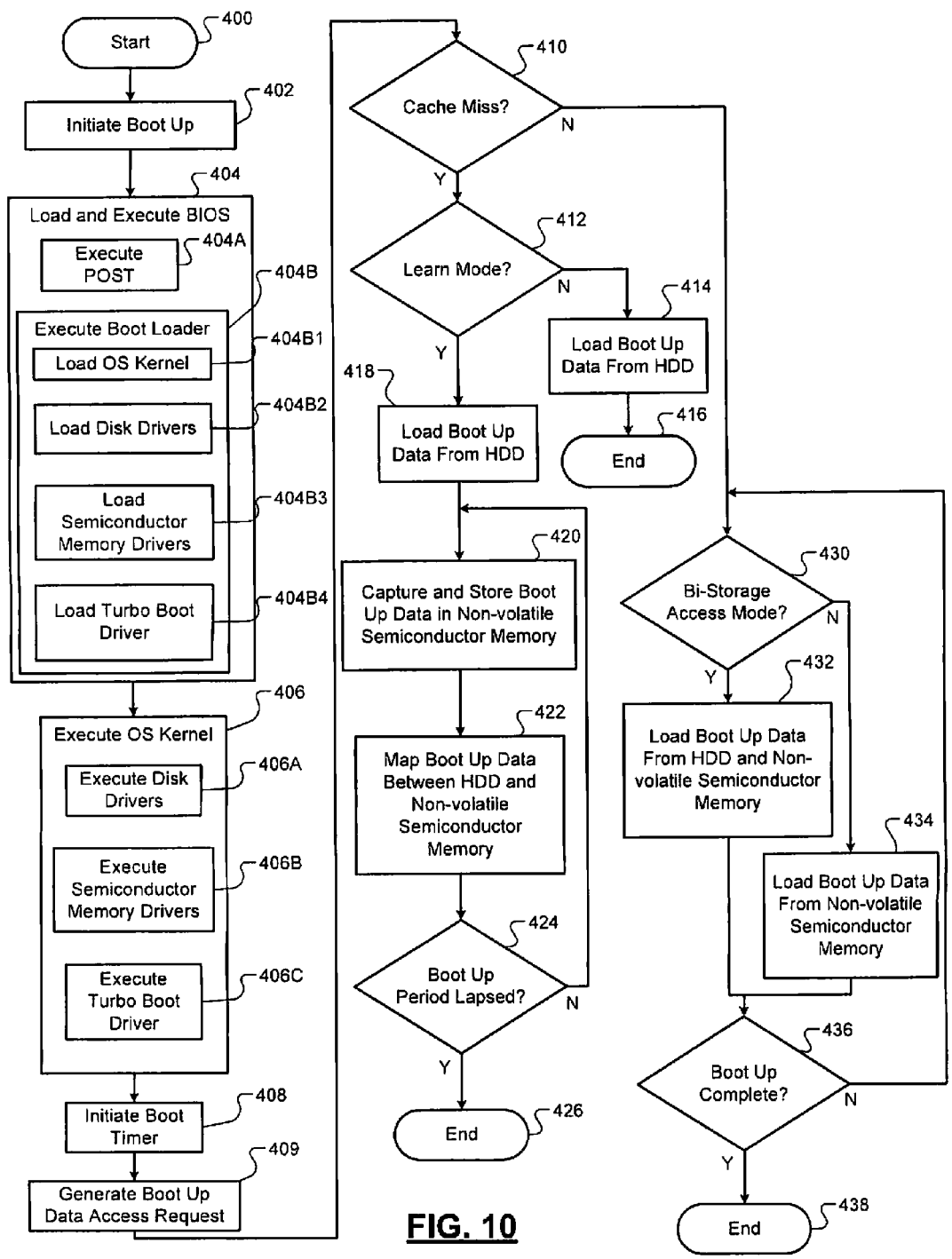
FIG. 10 illustrates a method of loading data during a boot up in accordance with an embodiment of the present disclosure.

FIG. 10 illustrates a method of loading data during a boot up. Although the following steps are primarily described with respect to the embodiment of FIGS. 3, 8 and 9, the steps may be applied to the other embodiments of the present disclosure. The method may begin at 400.

In step 402, a computer system is powered on and a boot up procedure is initiated. This may include the loading and executing of a master boot record from a HDD. The master boot record may be loaded into and executed from RAM of the computer system.

In step 404, a BIOS is loaded and executed. This may include the loading and executing of an extensible firmware interface (EFI) for personal computing (PC) based systems. The EFI defines a software interface between an operating system and platform firmware.

In step 404A, the master boot record may be used to load and execute a POST module. The POST module may be originally stored in ROM and loaded into and executed from the RAM.

In step 404B, the master boot record and/or the POST module may be used to initialize computer system hardware and load and execute a boot loader. The boot loader may be originally stored in the HDD and loaded into and executed from the RAM. The boot loader may be executed after execution of the POST module.

In steps 404B1-404B4, the boot loader may load respectively an OS kernel, disk drivers, semiconductor memory drivers and a turbo boot driver. The disk drivers may include a disk storage driver and a disk control driver. The semiconductor memory drivers may include a semiconductor memory driver and a semiconductor control driver.

In step 406, the boot loader may execute the OS kernel. The OS kernel may be executed from the RAM and configure an OS of the computer system. For example, the OS kernel may configure a Windows™ OS. Services and applications may be loaded during and after execution of the OS kernel. In steps 406A-406C, the OS kernel may respectively execute the disk drivers, the semiconductor memory drivers, and the turbo boot driver.

In the following steps, various tasks are performed by the turbo boot driver. The tasks may be performed by the host control module, a turbo boot driver module, and/or by a turbo boot control module.

In step 408, the turbo boot driver initiates a boot up timer. The boot up timer may initiate a counter, record an initiation timestamp, and monitors time lapsed from the initiation timestamp.

In step 409, a host control module and/or a file system generates a data access request to access boot up data stored on the HDD. The data access request may be provided to a disk storage driver, a storage driver and/or to a turbo boot driver. In one embodiment, the disk storage driver or the storage driver generates a data access signal that is provided to the turbo boot driver. In another embodiment, the turbo boot driver receives the data access request directly from the host control module or the file system.

In step 410, the turbo boot driver determines whether data associated with the data access request is stored (cached) in a NVSM. In other words, the turbo boot driver determines if there is a cache miss with respect to the date access request. The turbo boot driver proceeds to step 412 when the data is stored in the NVSM, otherwise control may proceed to step 430. The turbo boot driver may look up a sector number, a block ID and/or a LBA in a HDD-to-NVSM map to determine whether the data is stored in the NVSM.

In step 412, the turbo boot driver determines whether the computer system is operating in a learn mode. The computer system including the host control module, the turbo boot driver, the disk drivers, the semiconductor memory drivers and/or the storage drivers may operate in the learn mode. The computer system may operate in the learn mode when the computer system is booting up for a first time or during other boot ups in which boot up data in the NVSM is updated. The turbo boot driver proceeds to step 414 when the computer system is not operating in the learn mode, otherwise control proceeds to step 418.

In step 414, the boot up data is loaded from the HDD. After step 414, turbo boot driver may end at 416. In step 418, the turbo boot driver and/or a learn module loads the boot up data from the HDD and proceeds to step 420.

In step 420, the turbo boot driver and/or the learn module captures the boot up data, records a first address or location ID from the HDD and stores the boot up data in the NVSM at a second corresponding address or location ID. The boot up data, for example, may include system and auto-start driver data, OS data, OS kernel loader data, service and application data, or other boot up data. The length of the stored data may also be recorded and used when accessing the stored boot up data.

In step 422, the turbo boot driver and/or the learn module maps locations of the boot up data in the HDD to corresponding locations in the NVSM. This mapping may be performed as described above with respect to the embodiment of FIG. 8.

In step 424, the turbo boot driver may end at 426 when the boot up period has lapsed. The turbo boot driver may proceed to step 428 when the boot up period has not lapsed. In step 428, the turbo boot driver may return to step 420 when additional boot up data is to be loaded from the HDD or return to step 409 when additional data access requests are received.

In step 430, the turbo boot driver determines whether the computer system is operating in a bi-storage access mode. The computer system including the host control module, the turbo boot driver, the disk drivers, the storage drivers, and/or the semiconductor memory drivers may operate in the bi-storage access mode. The bi-storage access mode may include the accessing of data in the HDD while accessing data in the NVSM. The turbo boot driver proceeds to step 432 when the computer system is operating in the bi-storage access mode, otherwise to step 434.

In step 432, the turbo boot driver loads boot up data from both the HDD and the NVSM. The loaded boot up data is transferred to the file system. Data loaded from the NVSM may be data that was previously captured in a learn mode. The turbo boot driver may use a HDD-to-NVSM map and load a first set of data from the HDD and a second set of data from the NVSM. The first set of data may be distinct from and/or independent of the second set of data.

An OS image or portions thereof may be loaded from both the HDD and the NVSM. An OS image refers to a file that contains an OS, executable programs, and data files associated with the executable programs. Sequential read requests may be generated by the turbo boot driver and/or the bi-storage access module. A sequential read may include an HDD sequential read and a NVSM sequential read. As another example, a sequential read may include an OS SATA HDD sequential read and a NVSM sequential read.

The turbo boot driver and/or a bi-storage access module may use a load balancing algorithm to balance accessing of data from the HDD and the NVSM. The load balancing algorithm may determine which of the HDD and NVSM to read data from based on data traffic, the amount of data to access from each of the HDD and NVSM, the speed of the HDD and/or the speed of the NVSM, the amount of data currently being accessed from each of the HDD and the NVSM, etc. This provides efficient use of the HDD and the NVSM for quick boot up times.

In step 434, the turbo boot driver may use a HDD-to-NVSM map and load the boot up data from the NVSM and not from the HDD. The loaded boot up data is transferred to the file system. Data loaded from the NVSM may be data that was previously captured in a learn mode. In step 436, the turbo boot driver may end at 438 when the boot up procedure is complete, otherwise return to step 430 to continue loading the boot up data.

Figure 11:
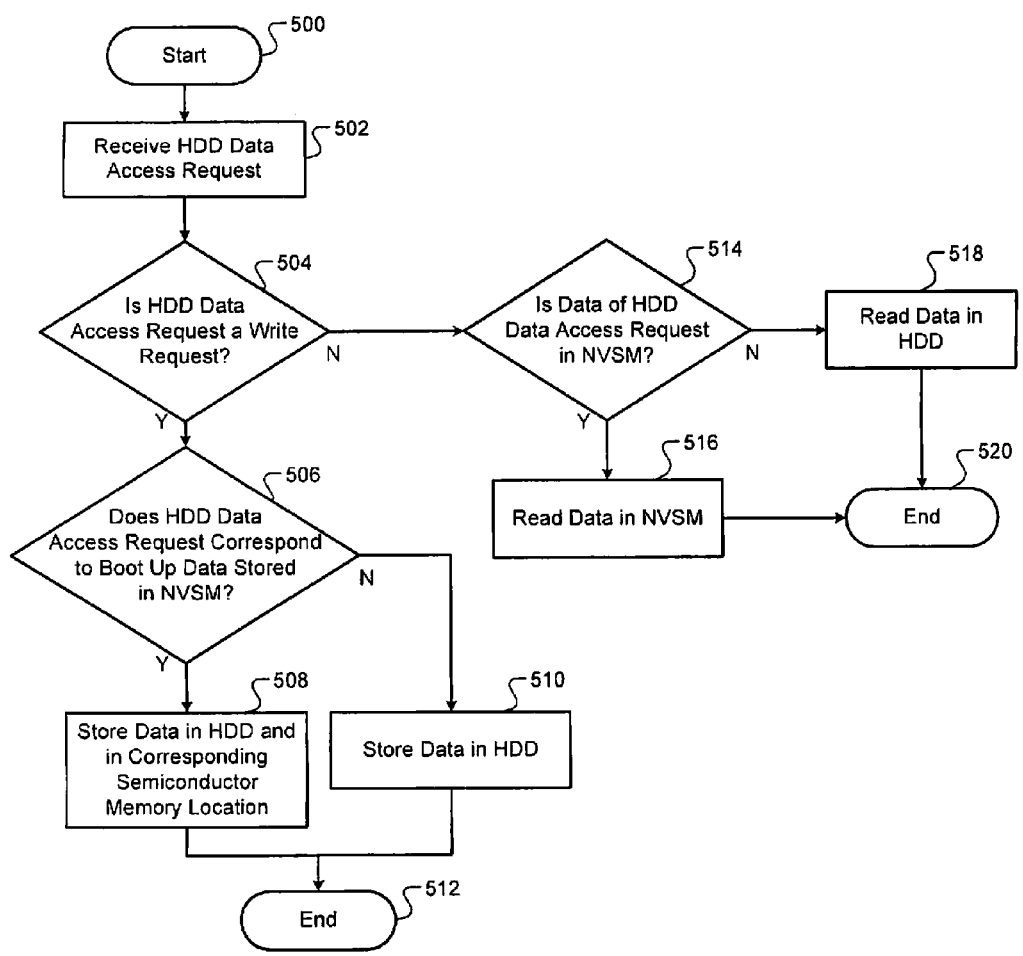
FIG. 11 illustrates a method of writing data to storage devices based on captured boot up data in accordance with an embodiment of the present disclosure.

FIG. 11 illustrates a method of writing data to storage devices based on captured boot up data in accordance with an embodiment of the present disclosure. The method may be performed by a host control module, a turbo boot driver module, and/or a turbo boot control module. The method may begin at step 500. This method may be performed when a computer system is in a boot up mode or after a boot up mode is complete. This method may not be performed during the learn mode.

In step 502, an HDD data access request may be received from a file system by a disk storage driver, a turbo boot driver, or a storage driver. In step 504, the turbo boot driver may proceed to step 506 when the HDD data access request is a write request, otherwise to step 514.

In step 506, the turbo boot driver may proceed to step 508 when the HDD data access request corresponds to boot up data stored in the NVSM, otherwise to step 510. In step 508, data is stored in the HDD and in a corresponding location of the NVSM. The same data is stored in the HDD and the NVSM. In step 510, data is stored in the HDD and not in the NVSM. The turbo boot driver may end at step 512.

In step 514, the turbo boot driver may proceed to step 516 when data associated with the HDD data access request is stored in the NVSM, otherwise to step 518. In step 516, the turbo boot driver reads data in the NVSM. In step 518, the turbo boot driver reads data in the HDD. The turbo boot driver may end at 520.

The above-described steps of FIGS. 10 and 11 are meant to be illustrative examples; the steps may be performed sequentially, synchronously, simultaneously, continuously, during overlapping time periods or in a different order depending upon the application.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system comprising:
a first interface configured to access a hard disk drive;
a second interface configured to access a non-volatile semiconductor memory, wherein the non-volatile semiconductor memory is separate from the hard disk drive;
a timer configured to indicate an end of a period during which a computer is booted up; and
a control module comprising a first circuit, a first processor, or a second memory, the control module configured to
in response to a first request for first data, determine whether the first data is stored in the non-volatile semiconductor memory,
in response to the first data not being stored in the non-volatile semiconductor memory, (i) loading the first data from the hard disk drive and booting up the computer a first time based on the first data loaded from the hard disk drive, and (ii) while operating in a learn mode and while loading the first data from the hard disk drive, capturing a first portion of the first data in the non-volatile semiconductor memory,
in response to the timer indicating the end of the period during which the computer is booted up the first time, ceasing the capturing of the first data in the non-volatile semiconductor memory,
based on the first portion of the first data captured in the non-volatile semiconductor memory during the learn mode, booting up the computer a second time,
in response to the first request and prior to accessing the first data from the hard disk drive, attempt to access the first data from the non-volatile semiconductor memory,
while attempting to access the first data from the non-volatile semiconductor memory, record a number of cache misses and a number of cache hits, and
in response to a ratio of the number of cache misses to the number of cache hits being greater than a threshold, store the first portion of the first data captured during the learn mode in the non-volatile semiconductor memory.

2. The system of claim 1, wherein the control module is configured to trigger the timer to start in response to the first request.

3. The system of claim 1, wherein the control module is configured to, while booting up the computer the second time, access (i) the first portion of the first data from the non-volatile semiconductor memory, and (ii) a second portion of the first data from the hard disk drive.

4. The system of claim 1, wherein the control module is configured to:
generate a second request to update data stored in the hard disk drive; and
update data stored in the non-volatile semiconductor memory based on the second request.

5. The system of claim 4, wherein the control module is configured to update the data stored in the hard disk drive based on the second request.

6. The system of claim 1, wherein the control module is configured to access a second portion of the first data from the hard disk drive while concurrently accessing the first portion of the first data from the non-volatile semiconductor memory.

7. The system of claim 1, further comprising a third memory configured to store:
a first driver configured to generate a second request, wherein the control module is configured to, based on the second request, access second data stored in the hard disk drive; and
a second driver configured to generate a third request based on the second request, wherein the control module is configured to, based on the third request, access third data stored in the non-volatile semiconductor memory.

8. The system of claim 1, further comprising a third memory configured to store a data module, wherein the data module is configured to (i) prior to storing the first portion of the first data in the non-volatile semiconductor memory, compress the first portion of the first data captured during the learn mode, and (ii) subsequent to accessing the first portion of the first data from the non-volatile semiconductor memory, decompress the first portion of the first data.

9. A system comprising:
a first interface configured to access a hard disk drive;
a second interface configured to access a non-volatile semiconductor memory, wherein the non-volatile semiconductor memory is separate from the hard disk drive;
a timer configured to indicate an end of a period during which a computer is booted up; and
a control module configured to
in response to a first request for first data, determine whether the first data is stored in the non-volatile semiconductor memory,
in response to the first data not being stored in the non-volatile semiconductor memory, (i) loading the first data from the hard disk drive and booting up the computer a first time based on the first data loaded from the hard disk drive, and (ii) while operating in a learn mode and while loading the first data from the hard disk drive, capturing a first portion of the first data in the non-volatile semiconductor memory,
in response to the timer indicating the end of the period during which the computer is booted up the first time, ceasing the capturing of the first data in the non-volatile semiconductor memory,
based on the first portion of the first data captured in the non-volatile semiconductor memory during the learn mode, booting up the computer a second time,
in response to the first request and prior to accessing the first data from the hard disk drive, attempt to access the first data from the non-volatile semiconductor memory,
while attempting to access the first data from the non-volatile semiconductor memory, record a number of cache misses and a number of cache accesses, and
in response to a ratio of the number of cache misses to the number of cache accesses being greater than a threshold, store the first portion of the first data captured during the learn mode in the non-volatile semiconductor memory.

10. A method comprising:
in response to a first request for first data, determining whether the first data is stored in a non-volatile semiconductor memory;
in response to the first data not being stored in the non-volatile semiconductor memory, (i) loading the first data from a hard disk drive and booting up a computer a first time based on the first data loaded from the hard disk drive, and (ii) while operating in a learn mode and while loading the first data from the hard disk drive, capturing a first portion of the first data in the non-volatile semiconductor memory, wherein the hard disk drive is separate from the non-volatile semiconductor memory;
in response to an end of a period during which the computer is booted up the first time, ceasing the capturing of the first data in the non-volatile semiconductor memory;
based on the first portion of the first data captured in the non-volatile semiconductor memory during the learn mode, booting up the computer a second time;
in response to the first request and prior to accessing the first data from the hard disk drive, attempting to access the first data from the non-volatile semiconductor memory;
while attempting to access the first data from the non-volatile semiconductor memory, recording a number of cache misses and a number of cache hits; and
in response to a ratio of the number of cache misses to the number of cache hits being greater than a threshold, storing the first portion of the first data captured during the learn mode in the non-volatile semiconductor memory.

11. The method of claim 10, further comprising, while booting up the computer the second time, accessing (i) the first portion of the first data from the non-volatile semiconductor memory, and (ii) a second portion of the first data from the hard disk drive.

12. The method of claim 10, further comprising:
generating a second request to update data stored in the hard disk drive; and updating data stored in the non-volatile semiconductor memory based on the second request.

13. The method of claim 12, further comprising updating the data stored in the hard disk drive based on the second request.

14. The method of claim 10, further comprising accessing a second portion of the first data from the hard disk drive while concurrently accessing the first portion of the first data from the non-volatile semiconductor memory.

15. The method of claim 10, further comprising:
generating a second request;
based on the second request, accessing second data stored in the hard disk drive;
generating a third request based on the second request; and
based on the third request, accessing third data stored in the non-volatile semiconductor memory.

16. The method of claim 10, further comprising:
prior to storing the first portion of the first data in the non-volatile semiconductor memory, compressing the first portion of the first data captured during the learn mode; and
subsequent to accessing the first portion of the first data from the non-volatile semiconductor memory, decompressing the first portion of the first data.

17. A method comprising:
in response to a first request for first data, determining whether the first data is stored in a non-volatile semiconductor memory;
in response to the first data not being stored in the non-volatile semiconductor memory, (i) loading the first data from a hard disk drive and booting up a computer a first time based on the first data loaded from the hard disk drive, and (ii) while operating in a learn mode and while loading the first data from the hard disk drive, capturing a first portion of the first data in the non-volatile semiconductor memory, wherein the hard disk drive is separate from the non-volatile semiconductor memory;
in response to an end of a period during which the computer is booted up the first time, ceasing the capturing of the first data in the non-volatile semiconductor memory;
based on the first portion of the first data captured in the non-volatile semiconductor memory during the learn mode, booting up the computer a second time;
in response to the first request and prior to accessing the first data from the hard disk drive, attempting to access the first data from the non-volatile semiconductor memory;
while attempting to access the first data from the non-volatile semiconductor memory, recording a number of cache misses and a number of cache accesses; and
in response to a ratio of the number of cache misses to the number of cache accesses being greater than a threshold, storing the first portion of the first data captured during the learn mode in the non-volatile semiconductor memory.

* * * * *